UNITED STATES PATENT OFFICE.

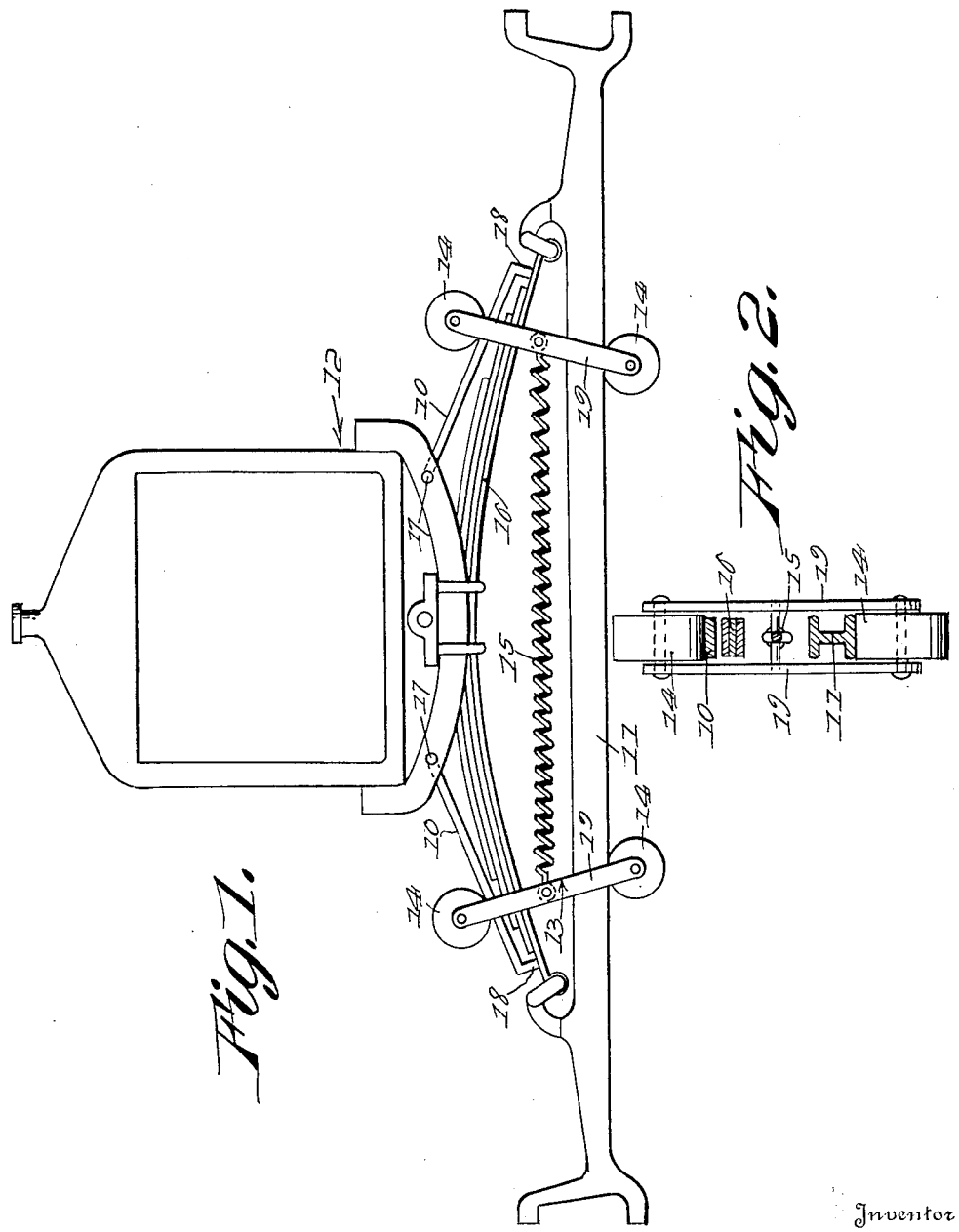

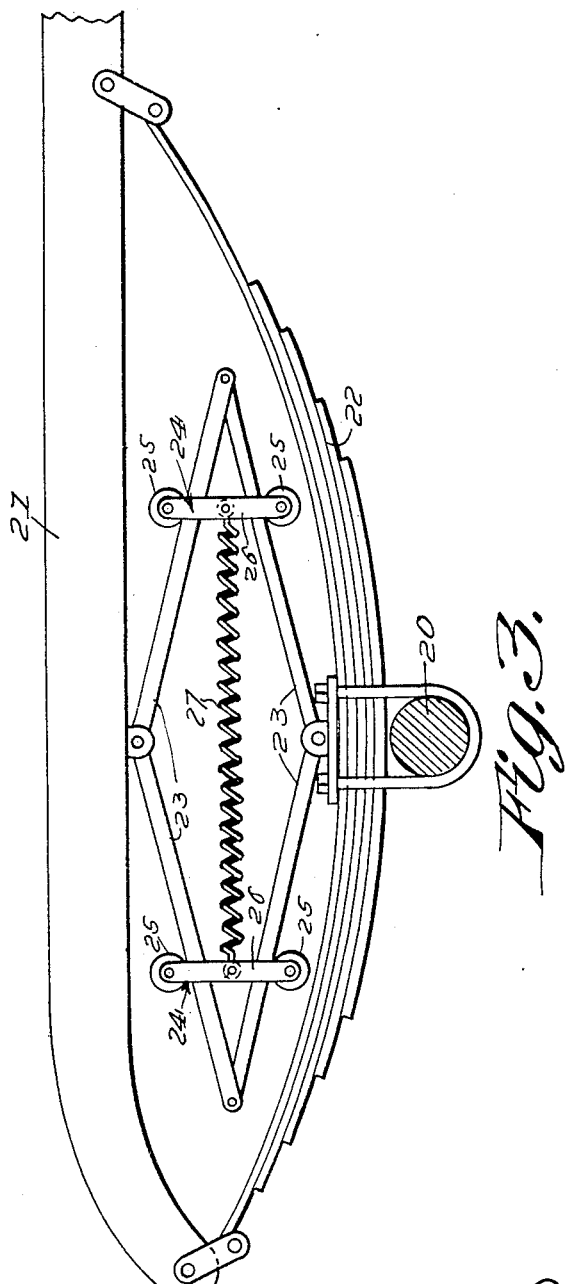

ORVAL K. HARLEY, OF JENKS, OKLAHOMA.

SHOCK-ABSORBER.

1,396,573.

Specification of Letters Patent.  Patented Nov. 8, 1921.

Application filed May 27, 1920. Serial No. 384,648.

*To all whom it may concern:*

Be it known that I, ORVAL K. HARLEY, a citizen of the United States of America, residing at Jenks, in the county of Tulsa and State of Oklahoma, have invented new and useful Improvements in Shock-Absorbers, of which the following is a specification.

The object of the invention is to provide a shock absorber mechanism applicable generally to automobiles or similar vehicles wherein the body is movable under spring resistance toward and from a plane of the chassis or running gear or the axle, for the purpose of tempering or modifying the reaction or rebound of the springs to minimize the shock or jolting action due thereto and insure the gradual return of the spring supported member such as the body to its normal position, and with this object in view the invention consists of a construction and combination of parts in which the preferred embodiment is illustrated in the accompanying drawings:

Figure 1 is a view of the absorber applied in the operative position to a vehicle of the automobile type, and for example to the forward body spring thereof.

Fig. 2 is a vertical sectional view of the same.

Fig. 3 is a view of the device in a slightly modified form applied to a different form or type of spring such as may be employed in connection with the rear supporting axle of an automobile or like vehicle.

Essentially the device consists of divergently disposed guide members represented in the form illustrated in Fig. 1 of the arm 10 and the axle 11, one of which, as the arm 10, is movable pivotally toward and from the other in accordance with the vertical movement of the body 12 of the automobile or other vehicle with relation to the fixed member of the machine as represented by the chassis running gear, or axle, and a traveler 13 having bearing members or elements 14, consisting of rollers or the like mounted to traverse said guide members and yieldingly impelled as by a spring 15 in the direction of divergence of said members. As the body supported by the vehicle spring 16 vibrates or moves vertically with reference to the fixed member of the vehicle represented in Fig. 1 by the axle 11, the relative divergence or angle of divergence of the guide members 10 and 11 varies by reason of the fact that one end of the member 10 is attached as at 17 to the body and appears at the other end as shown at 18 upon a suitable portion and leaf of the spring 16, and as the angle of divergence is reduced by the depression of the body toward the plane of the axle due to the wheels getting stuck due to bad road surface, the traveler moves inwardly or toward each other due to the spring 15 and hence depending upon the tension of said spring resisting and subsequent support of the traveler and hence the return of the movable guide members 10 to their normal position at the original angle of divergence from the guide member 11 and consequently preventing the spring 16 from reactively throwing the body above its normal position and causing the jar or jolt which is common in vehicles of this type.

In the construction illustrated the shock absorbing feature consisting of divergent guide members and the yieldingly actuated traveler consisting of bearing members 14 connected as in a fixed relation as to separation by a link 19, are duplicated, and a given spring 15 is employed within intermediate joints of the links 19 to cause a constant inward tendency of the traverse or a constant yielding impulse of the traveler in the direction of divergence of the guide members.

In the construction illustrated in Fig. 3 the same is involved in the form of the absorber attached for use in connection with the rear supporting action 20 and body frame 21 connected by the spring 22, and wherein the angularly disposed inwardly divergent guide members 23 are traversed by travelers 24 which consist of terminal bearing elements 25 connected by links 26, said traverse being actuated and impelled in the direction of divergence of the guide members of a spring 27.

Obviously in each of the forms which are typical of forms which embody the same principle and are attached to various relations of the supporting and supported elements or members of the absorber, the resistance of the traverse to the return of the supported member of the vehicle to its normal position in relation to its traveler thereon, is dependent upon the tension of the spring which furnishes the impulse of which the traveler is moved in the direction of divergence of the guide members.

The invention having been described as being what is new and useful is:

1. A shock absorber for vehicles comprising transverse guide members located above the main spring and movable with the spring supported body member of the vehicle toward and from the plane of the axle, and a traveler having retarding elements coacting with said transverse guide members, said retarding elements being inwardly impelled on deflection of the main spring.

2. A shock absorber for vehicles comprising in combination with the main spring and vehicle body, transverse guide members pivoted at one end to the body and bearing upon the spring, and a traveler having retarding elements bearing upon the guide members and impelled toward each other upon deflection of the main spring.

3. A shock absorber for vehicles comprising in combination with the axle, main spring and body of a vehicle, guide members pivotally connected at one end to the body and bearing upon the spring, and a traveler having retarding elements each of which embodies a duality of rollers bearing respectively on one of the guide elements and the under face of the axle, the retarding elements being impelled toward each other on deflection of the main spring.

In testimony whereof I affix my signature.

ORVAL K. HARLEY.